Oct. 4, 1960 W. J. RICHERT 2,955,174
ELECTRICAL RELAYS

Filed Dec. 2, 1957 2 Sheets-Sheet 1

INVENTOR
Walter J. Richert
D. C. Roylance
BY
ATTORNEY

Oct. 4, 1960 W. J. RICHERT 2,955,174
ELECTRICAL RELAYS
Filed Dec. 2, 1957 2 Sheets-Sheet 2

INVENTOR
Walter J. Richert
D. C. Roylance
BY
ATTORNEY

United States Patent Office 2,955,174
Patented Oct. 4, 1960

2,955,174

ELECTRICAL RELAYS

Walter J. Richert, Fort Branch, Ind., assignor, by mesne assignments, to American Machine & Foundry Company, a corporation of New Jersey Filed Dec. 2, 1957, Ser. No. 700,163

16 Claims. (Cl. 200—93)

This invention relates to novel improvements in electrical relays.

While many improvements in relays have been made in the past, new applications for such devices have created needs for further advances which would allow simplification of the mechanical structures involved and which would provide for positive actuation without being adversely affected by vibration and shock. Following these requirements, the present invention provides an improved, highly simplified relay structure, particularly including a novel armature mounting arrangement which, while not limited thereto, is especially applicable to a novel form of magnetically latched relay.

One object of the invention is to devise a novel relay armature mount which is both extremely simple and highly effective.

Another object is to provide a pivotal mount for relay armatures which does not require conventional shaft bearings, the armature being loosely positioned or confined by mechanical means and held in proper operating position magnetically.

A further object is to provide a novel form of magnetically latched relay to which such armature mount is particularly applicable.

Yet another object is to devise a two-position electromagnetic relay in which the armature is magnetically latched in one position and actuatable to the other position upon proper energization of electromagnetic actuating means, the magnetic latching effect being opposed by a combination of spring and magnetic forces which, though inadequate to overcome the magnetic latching effect, are sufficient to assure positive actuation of the relay to the other position when the actuating means is energized.

A further object is to provide a shock- and vibration-proof relay in which the armature is firmly locked in each switching position by strong permanent magnet forces which also provide high contact pressures not usually attainable in conventional relays of comparable size. The high contact pressures achieved by the present invention dampen vibratory movements of the movable contact structure of the relay which would ordinarily result when the contact structure is subjected to vibrations of its own resonant frequency or harmonics thereof. In this connection, the invention provides for a light weight, short, stiff movable contact structure, minimizing the acting forces under shock conditions. Also, the resonant frequency of the movable contact structure is thus increased, so reducing the total number of resonant conditions normally encountered when the structure is subjected to vibrations of a given frequency range.

A still further object is to provide a relay construction particularly applicable to miniature relays of extremely small size.

In order that the manner in which these and other objects are attained in accordance with the invention can be understood in detail, reference is had to the accompanying drawings, which form a part of this specification, and wherein.

Figure 1:
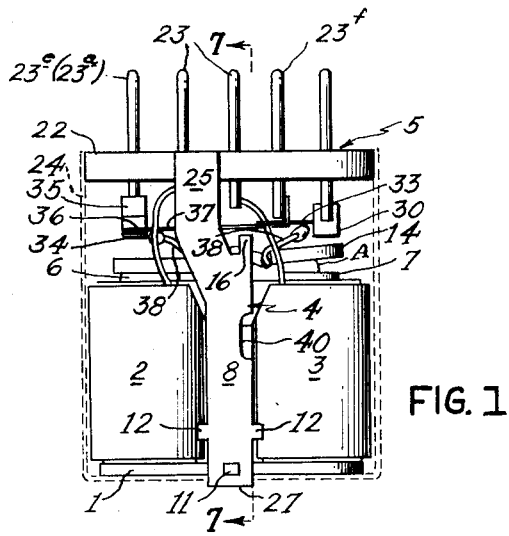
Fig. 1 is a side elevational view of a magnetically latched miniature relay constructed in accordance with one embodiment of the invention.

Referring now to the drawings in detail, Figs. 1–7 illustrate the invention as applied to a miniature relay magnetically latched to assure positive operation under conditions of vibration and shock. The relay includes a base plate 1 of magnetic material, a pair of parallel, spaced actuating coils 2, 3, a magnet and frame assembly 4, and a contact and terminal structure indicated at 5.

The base plate 1 is generally oblong, with semicircular ends and straight, parallel side edges. Coils 2 and 3 are secured in place in any suitable manner, as by screws (not shown) extending upwardly through the base plate and threaded into the core of the coil. The coils extend upwardly from the base with space being provided between the coils to accommodate the magnet and frame assembly. Coils 2 and 3 are provided with cores of non-retentive magnetic material, the cores having exposed upper end portions 6 and 7 which are somewhat larger in diameter than the core bodies.

Assembly 4 comprises thin frame strips 8 and 9 of brass or other non-magnetic sheet, and a permanent bar magnet 10 of rectangular transverse cross-section. Each strip 8, 9 is attached at its bottom end to a different side edge of base plate 1, as by a tongue and slot, as indicated at 11, Fig. 1, with the tongue on the base plate being brazed in the slot in the frame strip. Alternatively, strips 8, 9 can be secured to base plate 1 by resistance welding or in any other suitable manner. The frame strips extend upwardly from the base plate in parallel, spaced relation to each other. The frame strips 8, 9 are attached to the respective side faces of magnet 10, as by soldering, welding or brazing. To position the magnet prior to such attachment, the strips 8, 9 are each provided with fingers 12 bent inwardly at right angles to the plane of the strip and embracing the magnet in the manner shown in Figs. 2 and 7.

Figure 5:
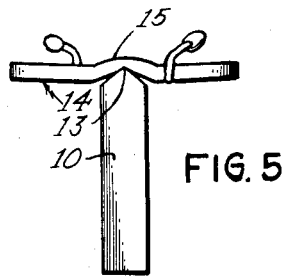
Fig. 5 is a side elevational view of the armature and an associated permanent magnet employed in the device of Fig. 1.
Figure 2:
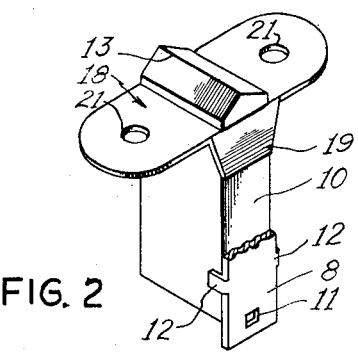
Fig. 2 is a perspective view of a portion of the device of Fig. 1.

As best seen in Figs. 2 and 5, the magnet 10 is provided at its upper end with converging end surfaces terminating in a sharp, exposed bearing edge 13 extending transversely of a line defined by the centers of ends 6 and 7 of the cores of the actuating coils. Extending between frame strips 8 and 9 is a pivoted armature 14 of magnetic material, the armature having at its center a transverse hump or offset portion 15, Fig. 5, defining a downwardly directed bearing groove engaged over the bearing edge 13 presented by magnet 10. Since armature 14 is of magnetic material, and is in contact with one pole face of the magnet, it is retained with its bearing groove in contact with edge 13 by reason of the magnetic effect of the magnet. Under all conditions of normal use, the effect of magnet 10 is adequate to retain the armature in proper position for pivotal motion about the bearing edge as an axis.

Frame strips 8 and 9 extend beyond armature 14 and, at opposed points immediately above the armature, have inwardly directed fingers 16 and 17, respectively, extending transversely of the relay to act as stops, limiting the travel of the armature away from bearing edge 13 in the event that the armature is separated from the magnet by an unusual shock. It will be noted that the central portion of the armature is of such width that the sides thereof are immediately adjacent frame strips 8 and 9, so that the frame strips provide stop surfaces effective to restrain the armature against lateral shifting in the direction of the bearing edge 13. Thus, frame strips 8 and 9 and fingers 16 and 17 combine to mechanically confine the armature loosely in approximately the correct position with respect to bearing edge 13, and the magnet 10 is effective to hold the armature firmly in operative position.

Mechanically interconnecting the upper end of magnet 10 and the upper ends of the cores of coils 2, 3 is a non-magnetic plate 18. Plate 18 has a central opening which matches the transverse cross-section of magnet 10, this opening being defined at the side edges of the plate by downwardly extending ears 19, 20, which lie flush against the corresponding side faces of the magnet. The end portions of plate 18 extend across the upper ends of coils 2 and 3, are provided with openings 21 accommodating the coil core bodies, and lie between the ends of the coils and the enlarged end portions 6, 7 of the cores.

Contact assembly 5 comprises a plate 22 acting both as a carrier for the electrical leads 23 and as a closure cap for the receptacle 24, Fig. 1, housing the relay. Plate 22 is provided with notches accommodating the upper end portions 25, 26 of the frame strips 8, 9, respectively, the tips of end portions 25, 26 being brazed or otherwise suitably secured rigidly to plate 22. At their lower ends, frame strips 8 and 9 have extensions 27 and 28, respectively, projecting through slots in the bottom of receptacle 24, to properly position the relay structure with respect to the receptacle.

Figure 3:
Fig. 3 is a top plan view of the device of Fig. 1.
Figure 7:
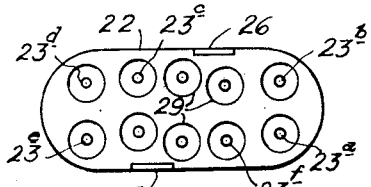
Fig. 7 is a vertical sectional view taken on the line 7—7, Fig. 1.

Plate 22 is provided with a plurality of openings, as seen at 29, Fig. 3, to accommodate the electrical leads 23. The leads 23 are secured in place by being embedded in masses of suitable insulating material filling the openings 29, in the usual manner.

Figure 6:
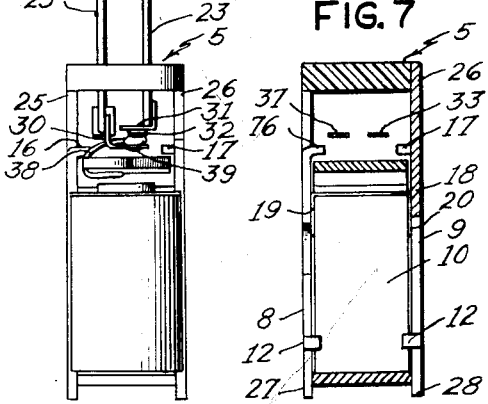
Fig. 6 is an end elevational view of the device of Fig. 1.

As will be clear from Figs. 1, 3 and 6, the end pairs of leads 23 carry the fixed contacts, while one of the leads of the pairs next adjacent to the end pairs carry the spring contact arms.

Thus, as seen in Fig. 6, lead 23$^a$ has secured to its lower tip, as by soldering, a fixed contact 30 of right angle configuration, while lead 23$^b$ has secured to its lower tip a similar fixed contact 31 spaced above contact 30. Disposed between contacts 30, 31 is a movable contact 32 carried by a thin spring contact arm 33 which is secured, at its end opposite contact 32, to the lower tip of lead 23$^c$. Similarly, leads 23$^d$ and 23$^e$ carry fixed contacts 34, 35, between which is disposed movable contact 36. Movable contact 36 is carried by a thin spring contact arm 37 fixed at its opposite end to lead 23$^f$.

Figure 4:
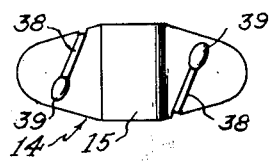
Fig. 4 is a top plan view of the armature of the device of Fig. 1.

As seen in Figs. 1, 4 and 5, the armature 14 carries two actuating arms 38 of wire, each arm 38 extending downwardly through a notch in the edge of the armature, being bent beneath the armature and soldered to the lower face thereof. The free end of each actuating arm 38 is covered by a spherical member 39 of insulating material. As will be clear from Figs. 1 and 6, the two actuating arms 38 are of such shape and are so positioned with respect to the armature 14 that each insulating member 39 is disposed below a different one of the spring contact arms 33, 37. Accordingly, when the armature 14 is pivoted about bearing edge 13, one of the insulating members 39 is moved upwardly into contact with the corresponding one of the spring contact arms, distorting such spring contact arm upwardly to bring the corresponding movable contact 32, 36 into engagement with the appropriate upper fixed contact, as will be evident from Fig. 6. The other insulating member 39 is moved downwardly, out of contact with its spring contact arm. The spring contact arms 33, 37 each occupy a normal position such that, when the arm is not engaged by insulating member 39, the spring contact arm assumes a position to maintain its movable contact in firm engagement with the corresponding lower fixed contact element 30, 34.

Movement of armature 14 is accomplished by electrically energizing one or both of the coils 2, 3. For illustration of "one coil operation," assume the armature occupies the position seen in Fig. 1. In this position, the armature 14 is magnetically latched to core portion 6. Spring contact arm 33 is distorted upwardly and therefore applies to the armature a spring force tending to unlatch the relay. Though there is a gap between core portion 7 and the end of armature 14 adjacent thereto, the permanent magnet flux leakage at this gap tends to aid the spring force applied by arm 33. Coil 2 is now energized, producing magnetic flux opposing the latching flux from the permanent magnet. When the combined effect of the flux from coil 2, the flux leakage at the gap at core portion 7 and the spring force applied to the armature by contact arm 33 exceeds the magnetic latching effect at core portion 6, the relay actuates to the other position, armature 14 then being magnetically latched to core portion 7. Reverse operation is accomplished by energization of coil 3 in a sense to repel armature 14, coil 2 having been de-energized.

In "two coil operation," assuming the armature 14 to be in the position shown in Fig. 1, coil 2 is energized in a sense to produce magnetic flux opposing the permanent magnet latching flux at 6, and coil 3 is simultaneously energized, in the opposite sense, to aid the permanent magnet leakage flux at 7. At the right end of the armature, as viewed in Fig. 1, the spring force applied by contact arm 33, the permanent magnet leakage flux and the magnetic flux produced by coil 3 all tend to pivot the armature into contact with core portion 7. At the other end of the armature, the forces just mentioned are aided by the flux from coil 2 and opposed only by the permanent magnet latching force at 6. When the sum of the spring force, leakage flux force and flux forces from coils 2 and 3 exceeds the magnetic latching force at 6, the armature is pivoted to contact core portion 7. Coils 2, 3 are now de-energized and the armature is latched magnetically to core portion 7 by the effect of the flux produced by permanent magnet 10 and passing through the armature and the core of coil 3.

Base plate 1 being of magnetic material, it will be noted that two flux paths are provided, one comprising magnet 10, half of armature 14, the core of coil 2, and half of the base plate, the other comprising the magnet, the other half of the armature, the core of coil 3, and the other half of the base plate. Advantageously, the bottom end of magnet 10 is either seated directly on the base plate 1 or disposed in very close proximity thereto. Then, one of the paths just described will always be continuous, substantially without air gaps, when armature 14 is actuated to latched position against the coil core in the one path.

The construction illustrated in Figs. 1–7 is particularly adapted for easy assembly without sacrifice in accuracy of positioning of the parts of the relay. Coils 2, 3 and non-magnetic plate 18 are first assembled on the base plate 1 as shown in Fig. 1. Magnet 10 is then inserted through the opening in plate 18. Frame strips 8, 9 are then placed in proper position, with fingers 12 engaging magnet 10, and is secured to the base plate 1 at 11. Base plate 1 is provided with a small aperture aligned with magnet 10. Armature 16 is placed in position on bearing edge 13, as seen in Fig. 5. Employing a tool inserted through the aperture in the base plate, magnet 10 is pushed upwardly until the armature engages fingers 16, 17. A shim having a thickness equal to the desired gap A, Fig. 1, is disposed on one of the core portions, say core portion 7. Magnet 10 and armature 14 are now lowered until the appropriate end of the armature engages the shim and the other armature end engages its associated coil core portion. With magnet 10 in this finally adjusted position, frame strips 8, 9 are soldered or otherwise rigidly fixed to the side surfaces of magnet 10 and respectively to ears 19 and 20. To aid in this operation, each of the frame strips 8, 9 is porvided with a notch 40, Fig. 1. Assembly 5 is then mounted by securing portions 25, 26 of the frame strips to plate 22, as shown. The coil leads are then connected to the appropriate terminal leads 23 to complete the assembly.

Figure 8:
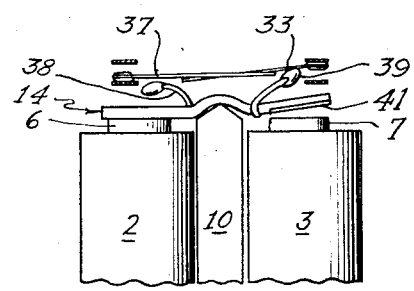
Fig. 8 is a fragmentary side elevational view of a miniature relay constructed in accordance with another embodiment of the invention.

Fig. 8 illustrates another embodiment of the invention which is constructed in the same fashion as the relay of Figs. 1–7 but is arranged to be actuated electromagnetically only in one direction, the armature being actuated in the opposite direction by spring force and the permanent magnet, when the coil or coils are de-energized. Here, there is provided on the bottom face of the end of the armature adjacent core portion 7 a non-magnetic shim 41.

Armature 14 again carries two contact actuators 38, one to actuate spring contact arm 33, the other to actuate spring contact arm 37. Spring contact arms 33, 37 are specially adjusted so that, when the armature 14 is pivoted into contact with core portion 6, contact arm 33 opposes with a predetermined spring force, say 13 grams, while, when the armature is in the opposite position, with shim 41 contacting core portion 7, contact arm 37 opposes with a greater predetermined force, say 22 grams. Coils 2, 3 are advantageously connected in series, to be simultaneously energized, with coil 2 providing flux which opposes the permanent magnet latching flux at 6 and coil 3 providing flux which aids the permanent magnet leakage flux (reduced by shim 41 in this embodiment) at 7. When the combined effect of the lesser spring force applied by contact arm 33, the leakage flux at 7 and the electromagnetically produced flux exceeds the permanent magnet latching force at 6, the armature will be pivoted in a direction to bring shim 41 into engagement with core portion 7. As such movement proceeds, an increasing opposing spring force is applied to the armature by contact arm 37, while the spring force applied by arm 33 decreases, both of these changes being in a sense which tends to require a greater flux from the coils. On the other hand, as such movement proceeds, the opposing effect of the permanent magnet flux at 6 decreases and the aiding effect of such flux at 7 increases, both of these changes tending to aid the flux from the coils. With these parameters in mind, the electromagnetic flux from coils 2, 3 is made such that, when the coils are energized at a predetermined current level, the armature is fully actuated to bring shim 41 into contact with core portion 7. The armature will now remain in this position so long as the coils are energized. To provide the necessary flux. Upon de-energization of the coils, or upon reduction of the current therein to a predetermined level, the spring force applied by contact arm 37 will start the armature return movement. As soon as the armature is thus moved beyond the magnetic balance point of the permanent magnet system, additional force applied by the permanent magnet flux at 6 helps to return the armature the rest of the way. When the armature reaches its "normal" position, as seen in Fig. 8, it is again latched by the effect of the permanent magnet.

Figs. 9–13 illustrate a third embodiment of the invention, applied to a 2-coil relay of heavier construction than that of Fig. 1. Here, the relay comprises a frame member 50 having a base 51, provided with dependent side flanges 52, and upstanding end members 53, 54 each provided with vertical side flanges 55. Secured to base 51 are two upright, parallel actuating coils 56, 57 spaced apart sufficiently to accommodate an upright permanent bar magnet 58. Coils 56, 57 are provided with non-retentive magnetic cores having end portions 59, 60, respectively, exposed at the upper ends of the coils. Coils 56, 57 are mounted on base 51 in any suitable fashion, as by screws (not shown) extending through the base plate and threaded into the lower end portions of the cores.

Like the permanent magnet 10 of the device of Fig. 1, the magnet 58 is longitudinally magnetized, so that, when the same is seated on base 51 between coils 56, 57, one pole face of the magnet is at the base and the other is disposed between the upper ends of the coils. The upper end portion of magnet 58 is disposed in a central opening 61 of a frame plate 62 which serves both as a hold-down for magnet 58 and as a mount for certain armature positioning means hereinafter described. Of non-magnetic material, the frame plate 62 has end portions provided with openings 63 embracing the coil core portions 59, 60. Core end portions 59, 60 are provided with laterally projecting lugs 59$^a$, 60$^a$, extending over the frame plate 62 and clamping the same against the ends of the coils. Thus, with coils 56, 57 rigidly mounted on base 51, frame plate 62 is also rigidly mounted with respect to the base.

Figure 12:
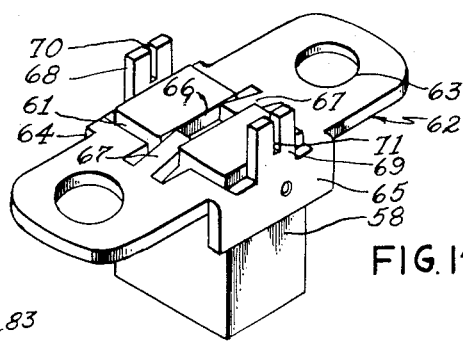
Fig. 12 is a view in perspective of a permanent magnet and associated frame member employed in the device of Fig. 9.

Two sides of the opening 61 are defined by dependent ears 64, 65 which are integral with plate 62 and spaced apart by a distance such that, when magnet 58 is disposed in opening 61, as shown in Fig. 12, ears 64, 65 lie flush against the side faces of the magnet. The upper end portion of magnet 58 is provided with a transverse slot 66 aligned with the centers of core portions 59, 60. Frame member 62 includes a pair of integral hold-down lugs 67 projecting into opening 61 and aligned with the centers of openings 63. Thus, when the magnet is in place in opening 61, the hold-down lugs 67 extend into slot 66.

Ears 64, 65 are provided with upwardly projecting portions 68, 69, respectively, these portions having vertical slots 70, 71 aligned transversely across the upper pole face of magnet 58 when the magnet and frame plate are assembled. As will be clear from Fig. 13, an armature pivot wire 72 of non-magnetic material is disposed with its ends secured in slots 70, 71, and an armature restraining wire 73 of non-magnetic material, disposed above and parallel to wire 72, extends through slots 70, 71, its end portions being bent downwardly and then inwardly, engaging in openings 74 in ears 64, 65. When wires 72 and 73 are in place as shown, portions 68, 69 of the ears are distorted in a fashion to narrow the slots, locking the wires in place.

Figure 10:
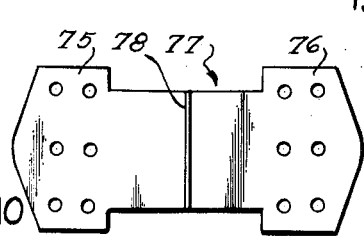
Fig. 10 is a bottom plan view of the armature of the relay of Fig. 9.
Figure 13:
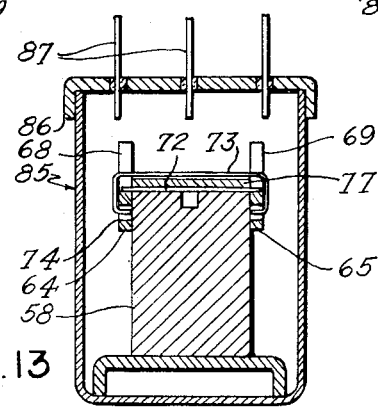
Fig. 13 is a vertical sectional view taken on the line 13—13, Fig 9.

Disposed between wires 72, 73, and having its end portions 75, 76 respectively adjacent core portions 59, 60, is an armature 77. Of plate-like configuration, the armature is of any suitable rigid magnetic material. As seen in Fig. 10, armature 77 is provided with a transverse groove 78 adapted to receive pivot wire 72, as seen in Fig. 13. As also seen in Fig. 13, the thickness of armature 77 is substantially less than the spacing between wires 72, 73.

Groove 78 advantageously has a depth substantially less than the diameter of pivot wire 72. The armature 77 is disposed very closely adjacent to the upper pole face of magnet 58. Thus, as indicated in Fig. 13, the pivot wire can lie in direct contact with the pole face of the magnet. In order that pivotal motion of the armature shall not be stopped by reason of contact between the armature and magnet, the armature is bent slightly along the line of groove 78, so that the two halves of the armature slant upwardly when the armature is in neutral position.

Figure 9:
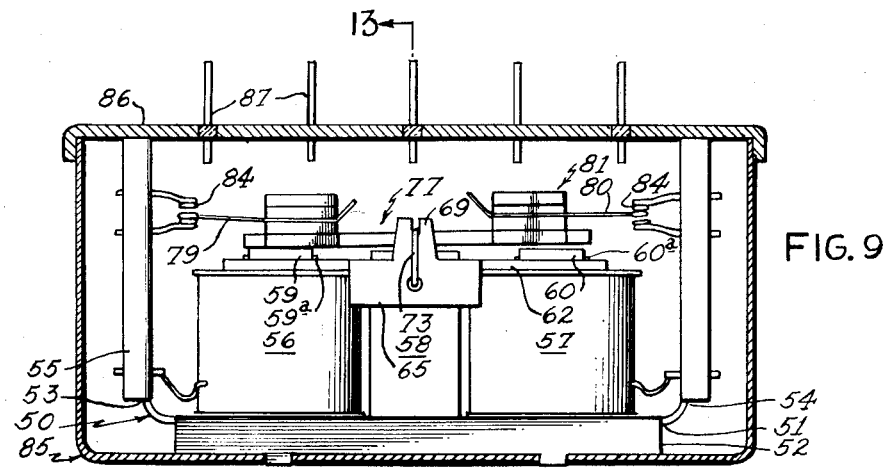
Fig. 9 is a side elevational view of a relay constructed in accordance with another embodiment of the invention, the casing thereof being shown in vertical section.

With the parts assembled as seen in Fig. 9, magnet 58 attracts armature 77, urging the same against pivot wire 72 and thus maintaining this wire properly seated in groove 78. Otherwise, the armature is not directly restrained. Projections 68, 69 serve as stops limiting lateral shifting of the armature, and upper wire 73 provides a stop limiting the armature as to movement away from the magnet. Because of the strong effect of magnet 58, however, neither lateral nor vertical movement of the armature will occur except under conditions of unusually severe shock.

Figure 11:
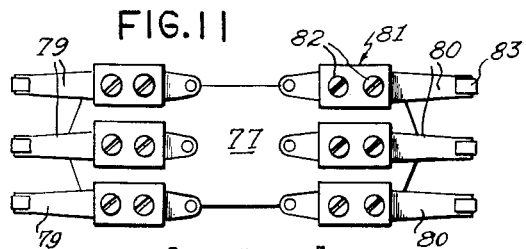
Fig. 11 is a top plan view of the armature and movable contact assembly of the relay of Fig. 9.

In this embodiment of the invention, the armature carries the movable contact arms of the relay. Thus, as seen in Fig. 11, three spring contact arms 79 are mounted on end portion 75 of the armature and three spring contact arms 80 are mounted on end portion 76. All of the spring contact arms 79, 80 are mounted on the upper face of the armature, each mounting comprising a sandwich 81, Fig. 11, comprising, in order, an outer metal plate, a first insulating plate, the contact arm, a second insulating plate, and the armature. Mounting screws 82 or other suitable fasteners extend through the sandwich to secure the same to the armature.

Figure 14:
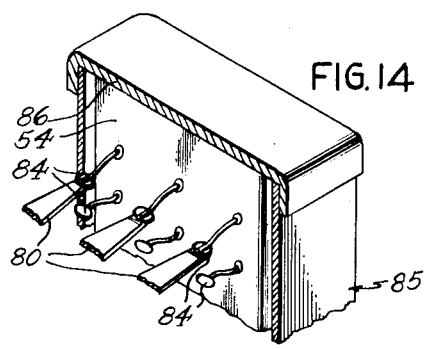
Fig. 14 is a fragmentary perspective view illustrating one contact assembly of the relay of Fig. 9.

Each of the spring contact arms carries, at its free tip, a movable contact 83. As seen in Figs. 9 and 14, the movable contacts 83 are each disposed between a different pair of vertically spaced fixed contacts 84 mounted, in any suitable fashion, on end frame members 53, 54. Thus, fixed contacts 84 are carried by stiff mounting wires extending through openings in the end frame members and secured therein by insulating material in the usual fashion.

The vertical spacing between the fixed contacts of each pair is substantially less than the travel which would be imparted to the movable contacts 83 by a full pivoted actuation of the armature, if the movable contacts were not restrained by the fixed contacts. The fixed contact pairs are so disposed as to be centered on the planes defined by movable contacts 83 when the armature is in neutral position.

Full actuation of the armature in either direction will bring one set of movable contacts into engagement with the corresponding upper fixed contacts, and the other set of movable contacts into engagement with the corresponding lower fixed contacts. Since the vertical spacing between the fixed contacts is less than the travel which would be imparted to the movable contacts by such actuation, all of the spring contact arms are flexed, applying spring forces to the armature which tend to return the armature.

It will be understood that the magnetic latching action of the relay of this embodiment is the same as described with reference to Fig. 1.

Advantageously, the relay of this embodiment is operated by selectively energizing the coil against the core of which the armature is magnetically latched. Assuming the armature is in the position shown in Fig. 9, coil 56 is energized in a sense to oppose the permanent magnet latching effect at 59. When the combined effect of the spring forces applied to the armature by contact arms 80, the permanent magnet leakage flux at 60, and the flux from coil 56 exceeds the permanent magnet latching force at 59, the armature will be pivoted to bring end portion 76 thereof into contact with core portion 60. Coil 56 being then de-energized, the armature is magnetically latched at 60. Reverse actuation is now accomplished by energizing coil 57 in a sense to provide flux opposing the permanent magnet latching force at 60.

The relay is provided with a suitable casing 85, the cover 86 of which carries lead terminals 87, to which the fixed contacts, movable contacts and coil terminals are connected. The frame members 53, 54 are advantageously fastened in a suitable manner to cover 86 to increase the rigidity of the assembled unit.

While, for illustrative purposes, the invention has been shown as applied to three particular types of relays, it will be understood that novel features of the invention find more general application.

I claim:

1. In a magnetically latched relay, the combination of a permanent magnet having two elongated opposite sides and a pole portion providing an exposed bearing edge extending transversely of the magnet between such sides, a pair of elongated frame members each overlying a different one of said sides and having ends extending beyond said bearing edge, an armature of magnetic material having an intermediate portion abutting said bearing edge and held in contact therewith by the magnetic effect of said magnet, said armature being retained by said elongated members against lateral shifting relative to said magnet in the direction of said bearing edge and including end portions spaced from said magnet, two actuating coils disposed adjacent said magnet each with its axis directed toward a different one of said armature end portions, each of said coils being provided with a core of magnetic material including an exposed end portion disposed for contact by the corresponding one of said armature end portions, a contact support member secured to said ends of said frame members above said armature, a pair of resilient contact arms mounted on said support member and extending generally transversely of said magnet above said armature, a pair of fixed contacts mounted on said support member, said contact arms being independent of each other and each disposed to cooperate with a different one of said fixed contacts, and a pair of contact arm engaging members each mounted on said armature on a different side of said bearing edge and each arranged to engage and displace a different one of said contact arms when said armature is pivoted in a direction to travel the portion of the armature on which such contact arm engaging member is mounted away from the corresponding one of said exposed core end portions, said contact arms being so constructed and located that, when an end portion of said armature is in engagement with one of said core end portions, one of said contact arms resiliently biases said armature in a direction to move such end portion of the armature away from such core end portion.

2. In a magnetically latched relay, the combination of two spaced, parallel actuating coils each provided with a core of magnetic material, said cores having exposed end portions facing in the same direction, a magnet mounted between said coils and having a pole portion positioned generally between said exposed end portions of said cores, an elongated armature of magnetic material extending across said pole portion of said magnet and said exposed end portions of said cores, means mounting said armature for pivotal motion about a transverse axis located at said pole portion of said magnet, the ends of said armature thus being movable toward and away from the respective ones of said exposed end portions of said cores, a first elongated spring contact arm, mounting means secured to one end portion of said first arm and mounting said arm above said armature, a second elongated spring contact arm, mounting means secured to one end portion of said second arm and mounting said second arm above said armature and in side-by-side relation with said first arm, one end portion of each of said contact arms being free, two pairs of fixed contacts, each of said pairs of fixed contacts being disposed adjacent the free end portion of a different one of said contact arms with such free end portions being disposed between the contacts of the corresponding pair and with the contacts of each pair of fixed contacts being spaced generally in the direction of travel of said armature, said contact arms each having a normal position in which the contact arm engages a predetermined one of the corresponding pair of fixed contacts, and a pair of contact actuating members carried by said armature each on a different side of the pivotal axis of said armature, each of said actuating members being arranged to engage a different one of said spring contact arms to displace the same into engagement with the one of the corresponding pair of fixed contacts which is farther from said armature when said armature is pivoted in a direction to move the portion thereof carrying such actuating member away from the corresponding core end portion, said armature, said spring contact arms and said contact actuating members being so constructed and positioned that pivotal movement of said armature into engagement with either of said core end portions distorts one of said spring contact arms in a sense tending to oppose such movement, said armature being magnetized by said magnet to provide magnetic latching engagement between said armature and said exposed core end portions when an end portion of said armature is moved into proximity to one of said core end portions.

3. In a magnetically latched relay, the combination of two spaced, parallel actuating coils each provided with a core of magnetic material, said cores having exposed end portions facing in the same direction, a magnet mounted between said coils and having a pole portion positioned generally between said exposed end portions of said cores, an elongated armature of magnetic material extending across said pole portion of said magnet and said exposed end portions of said cores, means mounting said armature for pivotal motion about a transverse axis located at said pole portion of said magnet, the ends of said armature thus being movable toward and away from the respective ones of said exposed end portions of said cores, two spring contact arms, each of said arms being mounted on and extending from a different end portion of said armature, and two pairs of fixed contacts, each of said pairs of fixed contacts being disposed adjacent the free end of a different one of said spring contact arms and the contacts of each pair being spaced, in the direction of movement of said armature ends, by a distance materially less than the total travel of the adjacent portion of the corresponding spring contact arm during one complete pivotal actuation of said armature, said spacing being centered on the median point of said travel, whereby actuation of said armature in either direction into contact with one of said exposed core end portions distorts both of said spring contact arms in a sense tending to oppose such actuation, said armature being magnetized by said magnet to provide magnetic latching engagement between said armature and said exposed core end portions when an end portion of said armature is moved into proximity to one of said core end portions.

4. In a magnetically latched relay, the combination of two spaced, parallel actuating coils each provided with a core of magnetic material, said cores having exposed end portions facing in the same direction, a permanent magnet mounted between said coils and having a pole portion positioned generally between said exposed end portions of said cores, an elongated armature of magnetic material extending across said pole portion of said magnet and said exposed end portions of said cores, means mounting said armature for pivotal motion about an axis transverse to said armature and located at said pole portion of said magnet, the ends of said armature thus being movable toward and away from the respective ones of said exposed end portions of said cores, two contact sets each including an elongated spring contact arm and a pair of fixed contacts spaced generally in the direction of movement of said armature, the spring contact arm of each set being secured at one end and having a free end portion disposed between the corresponding pair of fixed contacts, the spring contact arm of each set having a normal position in which it engages a predetermined one of the corresponding fixed contacts, pivotal movement of said armature about said axis in one direction being effective to distort one of said spring contact arms into engagement with the other of the corresponding fixed contacts and thereby establish in such spring contact arm a spring force opposing such movement, pivotal movement of the armature about said axis in the other direction being effective to distort the other of said spring contact arms into engagement with its other fixed contact and thereby establish in said other contact arm a spring force tending to oppose such pivotal movement, a non-magnetic frame member extending between said exposed end portions of said cores, said frame member being secured to said cores and having an intermediate portion provided with an opening, said magnet being disposed in said opening with the walls of said opening engaging and positioning said magnet, said armature being magnetized by said magnet to provide magnetic latching engagement between said armature and said exposed end portions when an end portion of said armature is moved into proximity to one of said core portions.

5. A relay constructed in accordance with claim 4 and wherein said frame member is provided with straight dependent side flanges and said magnet has flat side faces disposed in contact with said flanges.

6. A relay constructed in accordance with claim 5 and further comprising a base member of magnetic material extending between and connected to the ends of said cores opposite said armature, and a pair of non-magnetic frame members extending each along a different one of said side faces of the magnet, each frame member of said pair having an end portion fixed to said base member and a portion fixed to one of said dependent flanges, said pair of frame members extending beyond said armature.

7. A relay constructed in accordance with claim 6 and including a contact structure fixed to said pair of frame members and operatively associated with said armature.

8. A relay constructed in accordance with claim 5 and wherein said dependent flanges are each provided with a projection extending away from said pole portion, said projections being aligned transversely across said pole portion, said means providing the bearing surface being carried by said projections.

9. In an electromagnetic relay, the combination of two parallel, spaced actuating coils each having a core of magnetic material; a permanent magnet disposed between said coils and presenting a pole portion between adjacent ends of said cores; a non-magnetic frame member extending between said adjacent ends of said cores, said frame member being secured to said cores and having an intermediate portion provided with an opening, said pole portion of said magnet being disposed in said opening, said frame member being provided with straight dependent side flanges and said magnet having flat side faces disposed in contact with said flanges, said flanges being each provided with a projection extending away from said pole portion and said projections being aligned transversely across said pole portion; a bearing wire carried by and extending between said projections, and an armature of magnetic material spaced from said pole portion and said frame member and including an intermediate portion engaging said bearing wire and held in pivotal contact therewith by the magnetic effect of said magnet, said projections providing stop surfaces effective to limit lateral shifting of said armature, said armature including end portions adjacent said exposed end portions of said cores.

10. A relay constructed in accordance with claim 9 and further comprising a restraining member connected between said projections and disposed above said armature and parallel to said wire, said armature having a thickness at said wire less than the space between said wire and said restraining member.

11. A relay constructed in accordance with claim 4 and wherein said pole portion of said magnet is provided with a groove aligned with said adjacent end portions of said cores, said frame member including hold-down elements extending into said groove.

12. An electromagnetic relay comprising two parallel, spaced actuating coils each provided with a core of magnetic material, said cores being provided with exposed end portions facing in the same direction; an elongated longitudinally magnetized permanent magnet disposed between said coils and extending parallel thereto, said magnet presenting a pole portion located between said exposed end portions of said cores; frame means of non-magnetic material extending between and carried by said exposed end portions of said cores and including an intermediate portion having an opening embracing said pole portion of said magnet; means mounted on said frame member and extending across said pole portion to provide an exposed bearing surface directed away from said pole portion, and an armature of magnetic material having an intermediate portion abutting said bearing surface and held in pivotal contact therewith by the magnetic effect of said magnet, said armature having end portions adjacent said exposed end portions of said cores.

13. A relay constructed in accordance with claim 3 and further comprising a main frame of magnetic material having a base and two spaced end frame portions extending upwardly from said base, each of said cores having an end portion connected to said base, said magnet having a second pole portion in contact with said base, and each of said pairs of fixed contacts being mounted on a different one of said end frame portions.

14. In a magnetically latched electrical relay, the combination of a base member of magnetic material; an elongated permanent magnet having at each end a pole face of substantial extent, one such pole face being connected with said base member in good magnetic flux conducting relation, said magnet extending away from said base; two parallel, spaced actuating electromagnets disposed in side-by-side relation with said permanent magnet, with said permanent magnet located between said electromagnets, each of said electromagnets comprising a coil and an elongated core of magnetic material, each such core having one end attached to said base member in good magnetic flux conducting relation, the other ends of said cores being exposed and facing in the same direction, the other pole face of said permanent magnet being disposed between said other core ends; means at said other pole face presenting a bearing surface; an armature of magnetic material having a portion disposed in engagement with said bearing surface, said armature having end portions disposed each adjacent a different one of said other core ends, said armature being held in engagement with said bearing surface by the magnetic effect of said permanent magnet and being pivotable on said bearing surface upon energization of said electromagnets to bring the end portions of the armature into magnetic engagement with the corresponding ones of said other core ends, such engagement completing a flux path comprising said permanent magnet, said base member, the corresponding one of said cores, and said armature and so causing said armature to be latched in such engaged position by the magnetic effect of said permanent magnet; and contact means operatively associated with said armature for actuation by such pivotal movement thereof, said contact means including spring means effective to apply a biasing force to said armature in a direction to oppose the magnetic latching effect of said permanent magnet.

15. A relay in accordance with claim 14 and wherein a non-magnetic element is operatively disposed to prevent direct contact between one end portion of said armature and the adjacent one of said other core ends, and said spring means is constructed to apply a greater biasing force to the armature when said one end portion of the armature is engaged with the adjacent core end than when the other end portion of the armature is engaged with the core end adjacent thereto.

16. A relay in accordance with claim 14 and further comprising a non-magnetic member spaced from said base member and carried by and extending between said electromagnets adjacent said other pole face of said permanent magnet, said non-magnetic member mechanically engaging said permanent magnet to position the same.

References Cited in the file of this patent

UNITED STATES PATENTS

| | | |
|---|---|---|
| 1,606,164 | Garvin | Nov. 9, 1926 |
| 2,021,199 | Pearce | Nov. 19, 1935 |
| 2,404,227 | Hall | July 16, 1946 |
| 2,436,224 | Ogle | Feb. 17, 1948 |
| 2,477,120 | Ecker | July 26, 1949 |
| 2,515,771 | Hall | July 18, 1950 |
| 2,824,189 | Zimmer | Feb. 18, 1958 |

FOREIGN PATENTS

| | | |
|---|---|---|
| 605,422 | Great Britain | July 22, 1948 |